Sept. 14, 1943.  W. L. CARLSON  2,329,250
CRANKSHAFT
Filed April 6, 1942  2 Sheets-Sheet 1
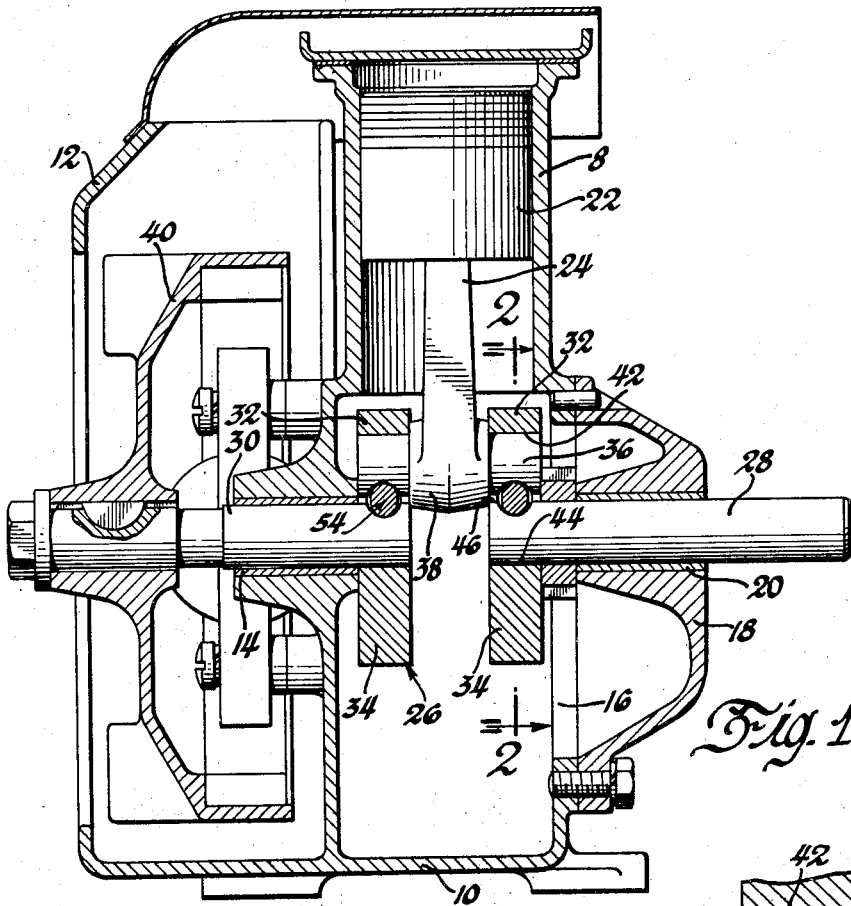
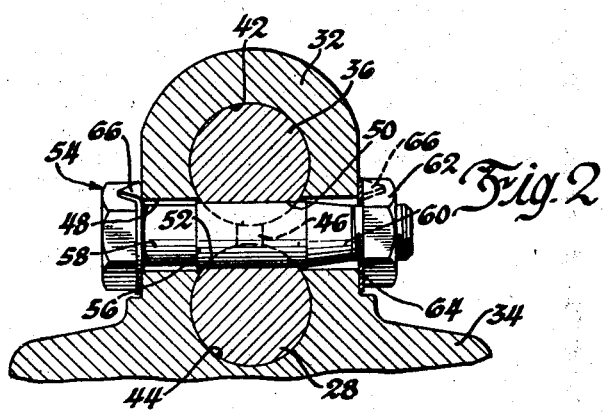
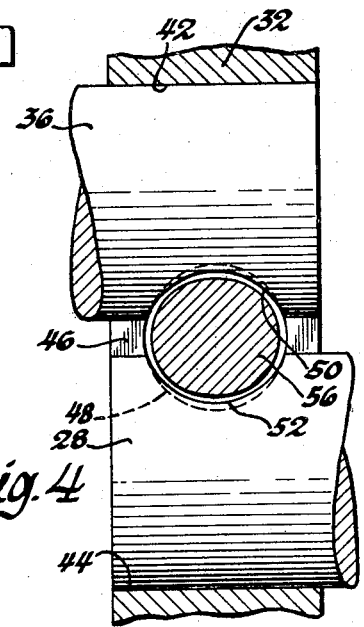
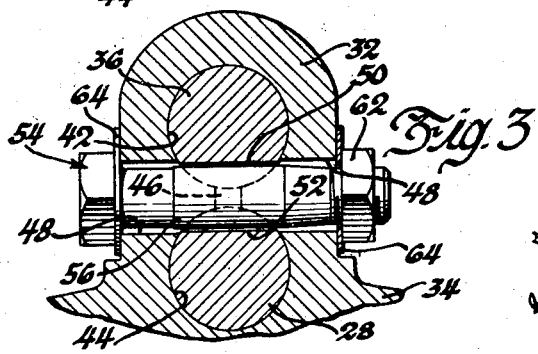
Inventor
Wilbur L. Carlson
By
Blackmore, Spencer & Flint
Attorneys Sept. 14, 1943. W. L. CARLSON 2,329,250
CRANKSHAFT
Filed April 6, 1942 2 Sheets-Sheet 2

Inventor
Wilbur L. Carlson
By Blackburn, Spencer & Hink
Attorneys

Patented Sept. 14, 1943

2,329,250

UNITED STATES PATENT OFFICE 2,329,250

CRANKSHAFT

Wilbur L. Carlson, Rochester, N. Y., assignor to General Motors Corporation, Detroit, Mich., a corporation of Delaware Application April 6, 1942, Serial No. 437,822

7 Claims. (Cl. 74—598)

This invention relates generally to crankshaft construction and more particularly to improvements in the construction of built-up crankshafts such as permit the use of solid end connecting rods.

One object of the invention is to provide a built-up crankshaft in which the several parts are of simple construction and may be readily assembled.

A further object is the provision of a crankshaft construction in which the parts are so constructed and related as to insure the proper alignment of the crank arms and crankshaft bearings.

A still further object is to provide a construction in which transverse eccentric bolts are employed to interlock the crank pin and shaft sections within the crank arms.

Other objects and the advantages of the improved construction will be apparent from the following description of the embodiments thereof which are shown in the accompanying drawings in which:

Figure 1 is a vertical section of a single cylinder engine embodying my improved crankshaft construction.

Figure 2 is an enlarged fragmentary transverse section taken substantially on line 2—2 of Figure 1.

Figure 3 is a view corresponding to Figure 2 showing the parts prior to final assembly.

Figure 4 is an enlarged fragmentary longitudinal section taken substantially centrally of Figure 3 with parts in elevation.

Figure 5:
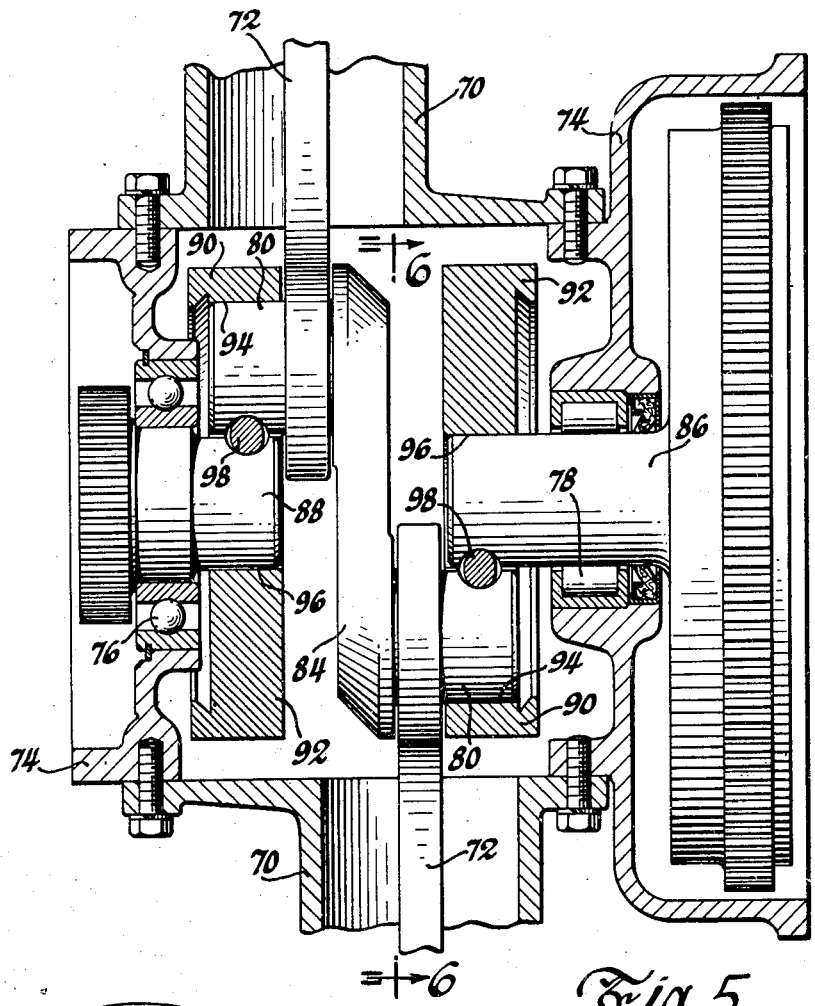
Figure 5 is a fragmentary sectional view showing my improved crankshaft construction for a two cylinder opposed engine.

Referring first to Figure 1, a single cylinder internal combustion engine is shown as including a cylinder 8 and crankcase 10 and flywheel housing 12 formed integral therewith. The crankcase is provided with a bearing bushing 14 and with an opening 16 which is adapted to be closed by a bearing plate 18 having a bearing bushing 20. Within the cylinder 8 is mounted a conventional piston 22 which is connected in a conventional manner by means of a connecting rod 24 to the crankshaft assembly indicated generally at 26.

The crankshaft assembly includes shaft sections 28 and 30, crank cheeks 32 with integral counterweights 34 on the inner adjacent ends of the shaft sections, and a crankpin 36 which extends between the crank cheeks and constitutes a journal for the closed end bearing 38 of the connecting rod 24. The shaft section 28 is journaled in the bearing bushing 20 and extends outside the bearing plate 18 for connection to any desired driven device, while the shaft section 30 is journaled in the bearing bushing 14 and may be connected as shown within the housing 12 to a flywheel 40.

Proceeding now to a detailed description of the crankshaft assembly and referring particularly to Figures 2 to 4, the crank cheeks 32 which form crank arms are each provided with parallel longitudinally extending bores 42 and 44 which are joined by a relatively narrow longitudinal slot 46 and with a transversely extending bore 48 which intersects an adjacent segment of each of the bores 42 and 44. The bores 42 in the crank cheeks are adapted to receive the ends of the crankpin 36, while the bores 44 are adapted to receive the inner ends of the sections 28 and 30.

The crackpin 36 is provided adjacent each end with a transverse arcuate or semi-circular groove 50, and similar grooves 52 are provided adjacent the inner ends of the shaft sections 28 and 30, and a locking bolt 54 is adapted to extend through the transverse bore 48 in each crank cheek. Each locking bolt 54 is formed with a central portion 56 of eccentric or elliptical cross section with a reduced portion 58 between this central portion and the bolt head and a reduced and tapering portion 60 between the central portion and the threaded end which is adapted to receive the nut 62. The central eccentric or elliptical portion 56 of each bolt is adapted to engage the opposed grooves 50 and 52 of the crankpin and respective shaft section and the reduced portions of the bolt provide clearance between the bolt and bore 48 in the crank cheek, and the tapering portion also facilitates the insertion of the bolt.

During the assembly of the several parts in the relation described above, it is contemplated that the bolts 54 will be bodily rotated to positively lock the parts together. Each nut 62 would be first drawn snug on its respective bolt and the bolt and nut then rotated so that the eccentric or elliptical portion of the bolt wedges between the grooves 50 and 52, and forces the crankpin and respective shaft section apart and outwardly against the bores 42 and 44 respectively, and the nut would then be tightened to draw the sides of the crank cheek together. Lock washers 64 may be provided and formed with corners which may be bent to engage the bolt head and nut as shown at 66 in Figure 2 after the final tightening of the nut.

It will be noted that Figures 3 and 4 show the relative positions of the several parts prior to rotation of the bolt 54 and final tightening of the nut 62. Although in these figures the crankpin 36 and shaft section 28 are shown in surface contact with the bores 42 and 44 respectively, it will be understood that this would ordinarily be a fairly loose fit prior to rotation of the bolt and tightening of the nut in the manner described above.

From the foregoing description it will be apparent that the bolts positively lock the crankpin and shaft sections together, and such bolts function both as driving keys and alignment elements, and since the bores 42 and 44 in the respective crank cheeks are parallel, the crankpin and shaft sections will be parallel after assembly and the shaft sections will be in axial alignment.

In the single cylinder engine construction shown in Figure 1 the several parts of the crankshaft assembly are adapted to be assembled by access through the opening in the crankcase which is provided by the removable bearing plate 18 in the following manner. The shaft section 30 may be first inserted through bearing bushing 14 and one of the crank cheeks applied to the inner end thereof. The piston and connecting rod may then be lowered within the cylinder and the crankpin 36 inserted through the closed lower end of the connecting rod and into the bore 42 of the crank cheek and one of the bolts 54 applied in the manner described above. Then the other crank cheek may be assembled on the end of the crankpin and the shaft section 28 assembled therewith by the other bolt as will be obvious.

If desired the construction of the engine of Figure 1 may be modified by providing a crankcase in one piece with integral spaced bearing openings for the shaft sections with a separate and detachable cylinder. In such a construction the crankcase bearings or bearing openings can be line reamed, and the several parts of the crankshaft assembly may be assembled by access through the cylinder opening in the crankcase.

Figure 6:
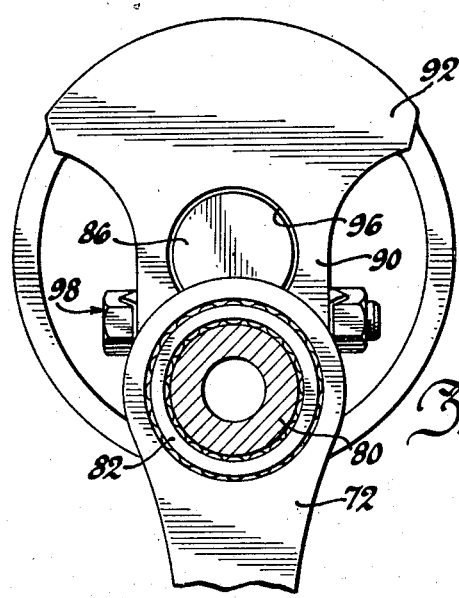
Figure 6 is a fragmentary transverse section taken substantially on line 6—6 of Figure 5.

Referring now to the modification of Figures 5 and 6, only fragmentary portions of the cylinders 70, connecting rods 72 and crankcase 74 of a two cylinder opposed engine have been illustrated in Figure 5. The crankcase 74 may include integral portions providing longitudinally spaced and aligned openings to receive crankshaft bearings, such as ball bearing 76 and roller bearing 78. In this construction, two crankpins 80 are provided to mount the closed ends of connecting rods 72 as by ball bearings 82, and such crankpins are preferably formed as shown as integral parts of a central crank arm 84.

The crank pins 80 are connected to shaft sections 86 and 88 in the same manner as has been heretofore described with reference to a single cylinder engine. Briefly, the crank cheeks 90 with integral counterweights 92 are each provided with parallel longitudinally extending bores 94 and 96 to receive respectively one of the wrist pins and shaft sections which are formed with opposed transversely extending arcuate or semi-circular grooves to be engaged by the eccentric or elliptical portion of the locking bolt 98 extending transversely through the crank cheek. The several parts of the crankshaft assembly of Figure 5 may be readily assembled within the crankcase by access through the oppositely located cylinder openings in the crankcase in an obvious manner.

Although the improved crankshaft construction has been herein shown and described only with reference to single cylinder or two cylinder opposed engines, it will be understood that the general arrangement of crankshaft parts of either Figures 1 or 5 may be readily adapted for use with engines having a greater number of cylinders by duplicating most of the parts and providing journaled shaft sections between some of the adjacent crank cheeks.

Many advantages of the present crankshaft construction, in addition to those specifically mentioned heretofore, will be apparent to those skilled in the art. The several parts of the crankshaft assembly can be readily manufactured since it will be seen that the shaft sections and crankpin can be ground on a centerless grinder, the transverse arcuate or semi-circular grooves in the crankpin and shaft sections can be easily machined and ground, and it is a relatively simple operation to drill and ream the several bores in the crank cheeks.

It should be understood that many changes or modifications in the specific construction shown and described herein will be obvious to those skilled in the art without departing from the spirit or scope of the present invention as defined by the claims appended hereto.

I claim:

1. In a crankshaft construction, a crank cheek having parallel longitudinal bores, a crankpin and a shaft section in said bores, and rotatable means extending through said crank cheek having a portion thereof formed to engage and wedge between said crankpin and shaft section on rotation of said means.

2. In a crankshaft construction, a crank cheek having parallel longitudinal bores, a crankpin and a shaft section in said bores, and rotatable means extending transversely through said crank cheek between said crankpin and shaft section, said means including a portion movable eccentrically of the axis of rotation thereof to engage said crankpin and shaft section.

3. In the crankshaft construction, a crank cheek having parallel longitudinal bores and a transverse bore intersecting a segment of each of said longitudinal bores, a crankpin and a shaft section in said longitudinal bores, opposed transversely extending arcuate grooves in said crankpin and shaft section, and a rotatable bolt extending through said transverse bore, said bolt having an eccentric portion located between said crankpin and shaft section and adapted to be engaged within said opposed grooves on rotation of said bolt.

4. In a crankshaft construction, a crank cheek having parallel longitudinal bores with a longitudinal slot interconnecting said bores between the sides of said crank cheek, a crankpin and a shaft section in said longitudinal bores, and a bolt extending transversely through said crank cheek between said crankpin and shaft section, said bolt being adapted to draw the sides of said crank cheek together and engage between said crankpin and shaft section to thereby clamp said crankpin and shaft section in said longitudinal bores.

5. In a crankshaft construction, a crank cheek having parallel longitudinal bores with a longitudinal slot interconnecting said bores between the sides of said crank cheek and a transverse bore intersecting a segment of each of said longitudinal bores, a crankpin and a shaft section in said longitudinal bores, opposed transversely extending arcuate grooves in said crankpin and shaft section, and a bolt extending through said transverse bore having an eccentric portion engaging said grooves, said bolt being adapted to draw the sides of said crank cheek together and adapted to be bodily rotated to thereby clamp said crankpin and shaft section in said longitudinal bores and prevent rotation and endwise movement thereof relative to said bores.

6. In a crankshaft construction, a crank cheek having parallel longitudinal bores and a transverse bore intersecting a segment of each of said longitudinal bores, a crankpin and a shaft section in said longitudinal bores, opposed transversely extending arcuate grooves in said crankpin and shaft section, and a rotatable bolt extending through said transverse bore, said bolt having an eccentric portion intermediate the ends thereof located between said crankpin and shaft section and adapted to be engaged within said opposed grooves on rotation of said bolt, and said bolt being reduced in cross section at each side of said eccentric portion to prevent contact thereof within said transverse bore of said crank cheek.

7. In a crankshaft construction, a crank cheek having parallel longitudinal bores with a longitudinal slot interconnecting said bores between the sides of said crank cheek, a crankpin and a shaft section in said longitudinal bores, and a bolt extending transversely through said crank cheek between said crankpin and shaft section, said bolt having a portion thereof formed to engage said crankpin and shaft section and force the same apart on rotation of said bolt, and said bolt having a head engaging one side of said crank cheek and a nut engaging the other side of said crank cheek whereby the sides of said crank cheek will be drawn together on rotation of said nut relative to said bolt.

WILBUR L. CARLSON.